United States Patent [19]
Colistro

[11] 4,440,235
[45] Apr. 3, 1984

[54] ROCK WINDROWER

[75] Inventor: Vincent Colistro, Humboldt, Canada

[73] Assignee: Schulte Industries Ltd., Englefeld, Canada

[21] Appl. No.: 397,078

[22] Filed: Jul. 12, 1982

[51] Int. Cl.³ .............................................. A07B 43/00
[52] U.S. Cl. ..................................... 171/63; 172/482
[58] Field of Search ....................... 171/44, 47, 63, 65; 172/466, 478, 482, 668, 675; 56/10.4, 208

[56] References Cited

U.S. PATENT DOCUMENTS

| | | | |
|---|---|---|---|
| 2,938,586 | 5/1960 | Gaffney | 171/63 |
| 2,971,587 | 2/1961 | Anderson | 171/63 |
| 3,117,631 | 1/1964 | Fahrenholz | 171/63 |
| 4,206,812 | 6/1980 | Viel | 171/63 |
| 4,315,546 | 2/1982 | Fahrenholz | 171/65 |

FOREIGN PATENT DOCUMENTS 1048791  2/1979  Canada ................................ 171/63

*Primary Examiner*—Gene Mancene
*Assistant Examiner*—John Weiss
*Attorney, Agent, or Firm*—Stanley G. Ade

[57] ABSTRACT

A windrower drum is journalled for rotation on the lower ends of and between a pair of arms each of which forms part of a transverse support member supported by the chassis. An arm extends upwardly from the transverse support and forms a crank arm with the aforementioned arms supporting the windrower drum. A floating cylinder lug is pivoted intermediate the ends thereof to said chassis and a piston and cylinder assembly extends between the distal ends of said crank arm and said floating cylinder lug. The weight of the drum and arms engages the drum with the ground with the depth of penetration being controlled by the effective length of the piston and cylinder assembly which acts as a rigid link when set. The drum, support arms, floating cylinder lug and crank arm all act as one unit so that the drum can elevate if an obstruction is encountered and returned by gravity to the preset position after passing the obstruction thereby eliminating any counterbalance springs and the like. The drum can be locked in a transport position or can be locked for frame levelling purposes.

9 Claims, 3 Drawing Figures

ROCK WINDROWER

BACKGROUND OF THE INVENTION

This invention relates to new and useful improvements in rock windrower machines, particularly windrower machines which utilize a transversely extending rotatable drum with teeth extending therefrom in a spiral formation to move rocks on the ground, to one side or the other, depending upon the construction of the radially extending teeth.

Conventional windrowers are usually provided with pressure reducing devices, to save wear and tear on the drum, and which control the engagement of the teeth with the ground normally maintaining the drum in the desired position. Usually, heavy duty springs are utilized for this purpose and it will be appreciated that this causes difficulty in dislodging embedded rock. The counter balance effect of the springs, which are required to protect the drum from damage due to immovable rock make it difficult for the drum to dislodge embedded rock. The effective drum weight is reduced by this counter balance mechanism.

What is required is a free floating drum having sufficient inherent weight to maintain it in the desired relative position with the ground thus using all of the inherent weight of the drum to dislodge rocks and means whereby this lowermost position is controlled. The means should also include means whereby the drum can be lifted clear of the ground for transport purposes. What is also required is a drum having sufficient strength so as to not require a counter balance mechanism to protect it against shock loading.

SUMMARY OF THE INVENTION

The present invention overcomes inherent disadvantages of existing equipment and satisfies the above requirements.

In accordance with the invention there is provided a rock windrower assembly comprising in combination a chassis, a hitch assembly on the front end thereof and ground engaging wheels mounted at the rear end thereof to support said chassis, a transversely situated rock windrower drum component, transverse support means mounted across said chassis for partial rotation therein, means extending from adjacent each end thereof to support said drum component for rotation, said drum component moving freely in an arc around the axis of said transverse support means, and means operatively connected between said chassis and said transverse support means to raise said drum clear of the ground for transport purposes, said drum moving downwardly and engaging the ground by gravity, said last mentioned means also controlling the limit of the downward movement of said drum component.

Another advantage of the invention is to provide, in a rock windrower assembly which includes a chassis, a hitch assembly on the front end thereof and ground engaging wheels mounted at the rear thereof to support said chassis, a transversely situated rock windrower drum component, transverse support means mounted across said chassis for free pivotal rotation therein, means extending from adjacent each end thereof to support said drum component for rotation, said drum component pivoting freely in an arc around the axis of said support means; the improvement which includes means operatively connected between said chassis and said support means to raise said drum clear of the ground for transport purposes, said drum moving downwardly and engaging the ground by gravity, said last mentioned means also controlling the limit of the downward movement of said drum.

Furthermore, the drum can be effectively locked in the working position to aid in levelling the framework before field use.

Another advantage of the invention is to provide a windrower assembly for rocks and the like which is easily pulled by a source of power such as a tractor which can also supply the necessary power to rotate the windrower drum.

A yet further advantage of the invention is to provide a device of the character herewithin described which is extremely simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the priciples of the present invention, in which:

DESCRIPTION OF THE DRAWINGS

In the drawings like characters of reference indicate corresponding parts in the different figures.

DETAILED DESCRIPTION

Figures 1, 2:
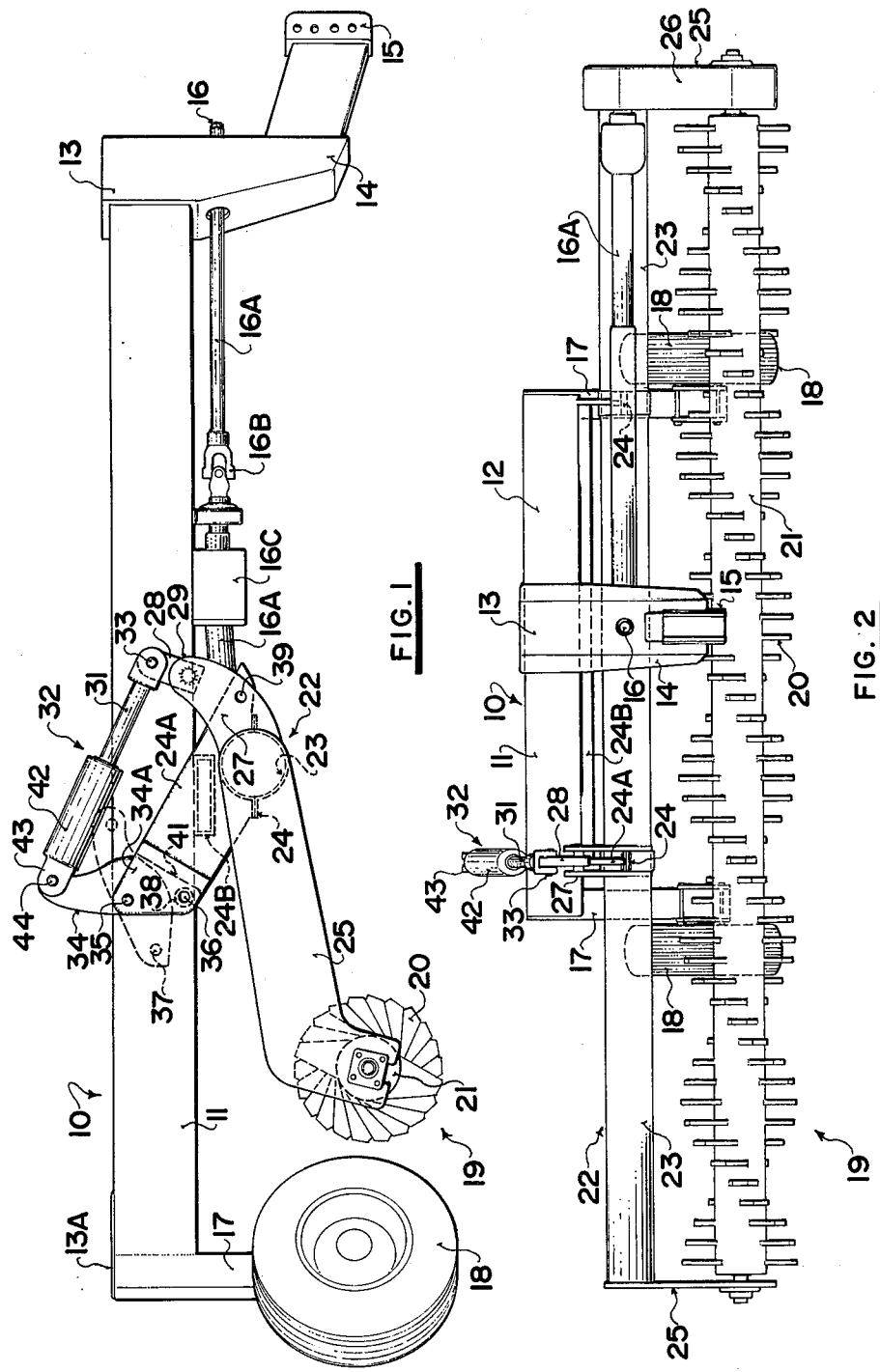
FIG. 1 is a side elevation of the device.
FIG. 2 is a front elevation thereof.

Proceeding therefore to describe the invention in detail, reference to FIGS. 1 and 2 illustrates a chassis collectively designated 10 including a pair of longitudinally extending frame members 11 and 12 extending from a front apex 13 and diverging rearwardly to the ends of a transverse cross member 13A which extends between the rear ends of the frame members 11 and 12.

A conventional hitch assembly 14 is situated at the apex 13 and includes the hitch plates 15 and a connection 16 for the power take-off of the towing tractor or the like (not illustrated).

Standards 17 extend downwardly from adjacent the rear ends of the frame members 11 and 12 and support for rotation, ground engaging wheels 18 which are conventional.

These are supported by axle plates 18A bolted to the standards 17 and can be adjusted as desired for levelling the frame.

A rock windrower drum component collectively designated 19 consists of a transversely situated drum 20 having a plurality of radially extending teeth 21 secured thereto and in the form of a spiral. One or more such spirals may be provided and the development of the spirals controls whether rocks and the like engaged by the drum, are moved to the left or right of the machine. However, such construction is well known and conventional and it is not believed necessary to describe same further.

A transverse support means is provided collectively designated 22 and takes the form of a cylindrical member 23 situated transversely under the frame and extending upon each side thereof and being journalled for rotation within bearings 24 in plates 24A secured to each end of a transverse frame member 24B spanning the underside of the frame members 11 and 12, said transverse frame members being positioned substantially intermediate the ends of the members 11 and 12. These plates may be welded or otherwise secured to the frame members.

An arm 25 is secured to each end of the cylindrical member 23 (pivoting with 23) and extends perpendicularly therefrom, said arms being in spaced and parallel relationship with one another and supporting for rotation adjacent the lower ends thereof, the aforementioned drum component 19. Such support is by means of conventional bearing construction and it is not believed necessary to show same in detail. Also, it will be appreciated that there is an operative connection between the power take-off connection 16 and the drum component 19 by means of conventional shafts 16A, universal joints 16B, gear boxes 16C and chain drives, the latter extending along one of the arms 25 and enclosed within chain casing 26.

The arms 25 incline rearwardly so that when the component 19 is engaged with the ground, it is in trailing relationship as clearly shown in FIG. 1.

It will also be appreciated that it is desirable to raise the drum component 19 clear of the ground for transportation purposes and this position is shown in phantom in FIG. 1.

The weight of the arms 25 and the drum component 19 are sufficient to move the drum downwardly into engagement with the ground, and subject to control means which will hereinafter be described, also sufficient to cause the desired penetration of the teeth 21 into the surface of the ground.

Figure 3:
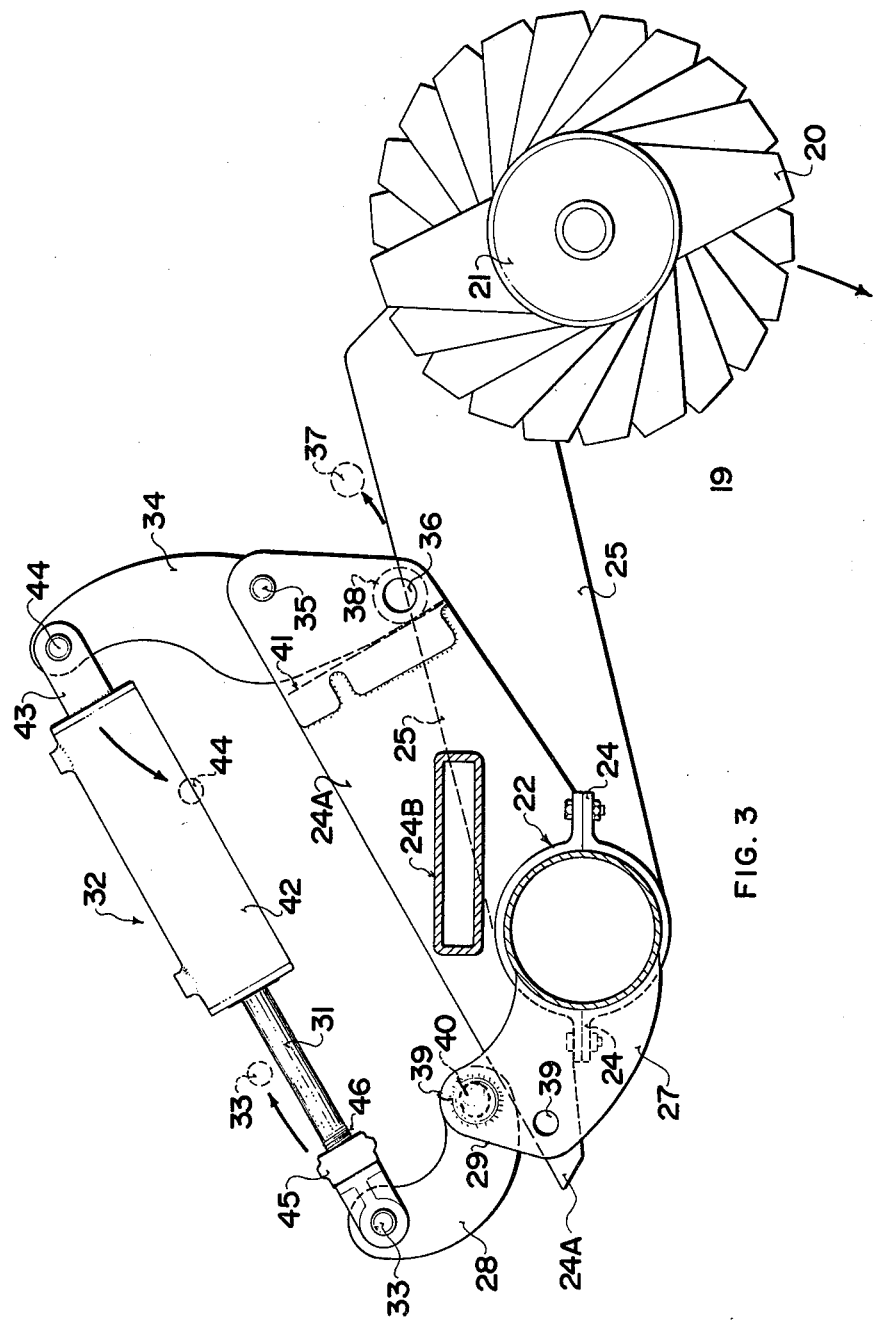
FIG. 3 is an enlarged fragmentary partially schematic side elevation of the drum component and positioning mechanism.

FIGS. 1 and 3 show details of this control means. A pair of crank arms 27 are also secured to the cylindrical member 23 as by welding or the like and extend upwardly therefrom perpendicular to the axis thereof and each of these crank arms includes an extending link 28 situated between the distal ends 29 and fixed thereto as by welding, as shown at 30. These crank arms 27 and links 28 also pivot with cylindrical member 23.

The piston rod 31 of a piston and cylinder assembly 32 is pivotally secured to the distal end of fixed link 28 by means of pivot pins 33.

Bearing plate 24A on this side of the machine includes a pair of spaced and parallel support plates 34A secured thereto and extending beyond the ends of plate 24A.

A floating cylinder lug 34 is pivoted intermediate the ends thereof to between the support plates 34A by means of a pivot pin 35.

An aperture 36 in plate 34A may align with a similar aperture 37 (shown in phantom in FIG. 1) when the floating cylinder lug 34 is in the position shown in full line in FIG. 1 and if the transport pin 38 is inserted as shown in phantom in FIG. 1, then a no-float condition is obtained for levelling purposes as will hereinafter be described.

When in the transport position shown in full line in FIG. 3, transport apertures 39 in crank arms 27 align with a corresponding aperture 40 in plate 24A shown in phantom in FIG. 3, so that the aforementioned transport pin 38 may be inserted through these apertures thus maintaining the drum in the transport position and relieving the load on piston and cylinder assembly 32.

In operation, and dealing first with adjustments which may be made to the rear wheels 18, the transport pin 38 is inserted through apertures 36 and 37 thus providing the aforementioned no-float condition. The piston and cylinder assembly 32 is retracted so that the drum supporting framework and cylindrical member 23 pivots within the bearings 24 and the drum component is forced down onto the ground thereby raising the main frame and wheels slightly so that the individual wheels can be adjusted vertically on standards 17 in order to level the machine fore and aft.

Extending the piston and cylinder assembly 32 removes the drum component from the ground and lowers the wheels 18 into contact with the ground whereupon the transport pin is removed from the apertures 36 and 37 for field use.

In field use, the piston and cylinder assembly is retracted thus lowering the drum component 19 to the working position. The amount to which the piston and cylinder assembly is retracted establishes the working depth, that is, the penetration of the teeth into the ground.

Once this position is reached, the piston and cylinder assembly 32 effectively forms a solid link between the fixed link 28 and the floating cylinder lug 34 and windrowing may take place in a conventional manner with the teeth 21 either penetrating the ground slightly or being on the surface of the ground depending upon the rock and stone condition. If the drum component 19 strikes an immovable object such as a rock too large to be moved by the windrower, the drum component 19 will move upwardly with the arms 25, the cylindrical member 23, the crank arms 27 and fixed lug 28, the piston and cylinder assembly 32 and the floating cylinder 34, acting as a single rigid unit rotating in the bearings 24. Once the obstruction has been passed, the weight of the drum component 19 and the arms 25 will cause the drum component to move downwardly to the preset condition.

In this regard, it should be observed that the lower end portion of the floating cylinder lug 34 which extends below the pivot 35, is situated between the pair of spaced and parallel support plates 34A and engages the upper end 41 of the plate 24A thus restricting the rearward movement of the upper portion of the lug 34 and hence the rearward movement of the cylinder 42 of the piston and cylinder assembly 32, it being understood that the cylinder 42 is pivotally secured by means of lugs 43, and pivot pin 44, to adjacent the upper end of the floating cylinder lug 34, as clearly shown.

Further adjustment of the working depth of the windrower teeth may be obtained by a depth stop collar 45 screw threadably engaging the screw threaded portion 46 of the piston rod adjacent the end which is connected to pivot pin 33. This allows the piston and cylinder assembly 32 to be fully retracted when the assembly is in the field working position and prevents any creep which may occur.

When the piston and cylinder assembly 32 is fully extended, the drum component 19 is raised to the transport position shown in full line in FIG. 3 whereupon the aforementioned transport pin 38 may be engaged through the aforementioned transport apertures 39 in crank arms 27 and the corresponding aperture 40 in plate 24A with a keeper (not illustrated) being engaged with the pin to prevent inadvertent disengagement. This fixes the drum supporting framework and the drum to the main frame. The pin 38 acts as a safety device in the event that hydraulic pressure be lost while transporting the windrower so that the rotary member or drum component will remain in the raised position.

It should be stressed that the raising of the drum component 19 if an obstruction is encountered, occurs so that it is free to pass over the object without lifting the main frame.

Since various modifications can be made in my invention as hereinabove described, and many apparently widely different embodiments of same made within the spirit and scope of the claims without departing from such spirit and scope, it is intended that all manner contained in the accompanying specification shall be interpreted as illustrative only and not in a limiting sense.

I claim:

1. A rock windrower assembly comprising in combination a chassis, a hitch assembly on the front end thereof and adjustable ground engaging wheels mounted at the rear end thereof to support said chassis, a transversely situated rock windrower drum component, a transverse support mounted across said chassis for partial rotation therein, arms extending from adjacent each end thereof to support said drum component for rotation, said drum component moving freely in an arc around the axis of said transverse support, and means operatively connected between said chassis and said transverse support to raise said drum clear of the ground for transport purposes, said drum moving downwardly and engaging the ground by gravity, said last mentioned means also controlling the limit of the downward movement of said drum component, said means operatively connected between said chassis and said transverse support including at least one crank arm having ends and secured by one end thereof to said transverse support means and extending perpendicularly therefrom, a floating cylinder lug pivoted intermediate said ends thereof to said chassis and a hydraulic piston and cylinder assembly operatively extending between the other end of said crank arm and one end of said floating cylinder lug, stop means on said chassis restricting the movement of the other end of said floating cylinder lug rearwardly, extension of said piston and cylinder assembly raising said drum component to a transport position, retraction of said piston and cylinder assembly lowering said drum component to a field working position and limiting the working depth of said drum component, said piston and cylinder assembly acting as a rigid link when positioned whereby said drum component, said crank arm, said piston and cylinder assembly and said floating cylinder lug all pivot around said transverse support means as one unit whereby said drum component lifts if said drum component engages an obstruction within the ground and whereby the weight of said drum component and said arms returns said drum component to the preset working position, and means to detachably lock said floating cylinder lug to said chassis in a no-float relationship, whereby retraction of said piston and cylinder assembly engages said drum component with the ground and further retraction raises said chassis for chassis levelling.

2. The assembly according to claim 1 in which said chassis includes a pair of longitudinally extending main frame members diverging rearwardly from said hitch assembly and a cross member extending between the spaced apart rear ends of said frame members, said transverse support being journalled for free partial rotation across and underneath said frame member intermediate the ends of said frame members.

3. The assembly according to claim 1 in which said arms are secured by one end thereof, one to adjacent each end of said transverse support perpendicularly therefrom in spaced and parallel relationship with one another, said drum component being journalled for rotation within adjacent the other ends of said arms, the weight of said arms and said drum component normally urging said drum component downwardly and pivoting said transverse support means in said chassis.

4. The assembly according to claim 2 in which said arms are secured by one end thereof, one to adjacent each end of said transverse support perpendicularly therefrom in spaced and parallel relationship with one another, said drum component being journalled for rotation within adjacent the other ends of said arms, the weight of said drums and said drum component normally urging said drum component downwardly and pivoting said transverse support means in said chassis.

5. The assembly according to claim 4, which includes means to detachably lock said drum component in the transport position.

6. The assembly according to claims 1, 2 or 3 which includes means to detachably lock said drum component in the transport position.

7. In a windrower assembly which includes a chassis, a hitch assembly on the front end thereof and ground engaging wheels mounted at the rear thereof to support said chassis, a transversely situated rock windrower drum component, a transverse support mounted across said chassis for free pivotal rotation therein, arms extending from adjacent each end thereof to support said drum component for rotation, said drum component pivoting freely in an arc around the axis of said transverse support; the improvement which includes means operatively connected between said chassis and said support to raise said drum clear of the ground for transport purposes, said drum moving downwardly and engaging the ground by gravity, said last mentioned means also controlling the limit of the downward movement of said drum, including means to detachably lock said floating cylinder lug to said chassis in a no-float relationship.

8. The improvement according to claim 7 in which said means operatively connected between said chassis and said transverse support includes a crank arm having ends and secured by one end thereof to said transverse support and extending perpendicularly therefrom, a floating cylinder lug pivoted intermediate said ends thereof to said chassis and a hydraulic piston and cylinder assembly operatively extending between the other end of said crank arm and one end of said floating cylinder lug, stop means on said chassis restricting the movement of the other end of said floating cylinder lug rearwardly, extension of said piston and cylinder assembly raising said drum component to a transport position, retraction of said piston and cylinder assembly lowering said drum component to a field working position and limiting the working depth of said drum component, said piston and cylinder assembly acting as a rigid link when positioned whereby said drum component, said crank arm, said piston and cylinder assembly and said floating cylinder lug all pivot around said transverse support means as one unit whereby said drum component lifts if said drum component engages an obstruction within the ground and whereby the weight of said drum component and said arms returns said drum component to the present working position.

9. The assembly according to claims 7 or 8 which includes means to detachably lock said drum component in the transport position.

* * * * *